United States Patent [19]

Obara et al.

[11] Patent Number: 5,039,834
[45] Date of Patent: Aug. 13, 1991

[54] APPARATUS FOR WIRE TENSION CONTROL AND DISCONNECTION DETECTION

[75] Inventors: Haruiki Obara, Toyama; Syunzo Izumiya, Fujiyoshida, both of Japan

[73] Assignee: Fanuc Ltd., Yamanashi, Japan

[21] Appl. No.: 397,454

[22] PCT Filed: Jan. 24, 1989

[86] PCT No.: PCT/JP89/00061
§ 371 Date: Aug. 14, 1989
§ 102(e) Date: Aug. 14, 1989

[87] PCT Pub. No.: WO89/07031
PCT Pub. Date: Aug. 10, 1989

[30] Foreign Application Priority Data
Feb. 3, 1988 [JP] Japan ................. 63-22119

[51] Int. Cl.$^5$ .............................. B23H 7/10
[52] U.S. Cl. ................................ 219/69.12
[58] Field of Search ........... 219/69.12, 69.15, 69.19

[56] References Cited
U.S. PATENT DOCUMENTS 4,242,556 12/1980 Ullmann et al. ............. 219/69.12
4,298,782 11/1981 Wavre ....................... 219/69.12
4,530,471 7/1985 Inoue ......................... 219/69.17

FOREIGN PATENT DOCUMENTS 144633 9/1982 Japan .................. 219/69.15
58-2011 1/1983 Japan .
202726 11/1983 Japan ................. 219/69.19
175926 10/1984 Japan ................. 219/69.12
259329 12/1985 Japan ................. 219/69.12
193727 8/1987 Japan ................. 219/69.12
236627 10/1987 Japan ................. 219/69.12

Primary Examiner—Geoffrey S. Evans
Attorney, Agent, or Firm—Staas & Halsey

[57] ABSTRACT

An apparatus for wire tension control and disconnection detection for a wire-cut electric discharge machine is provided, which is capable of effecting accurate wire tension control and disconnection detection and entailing only low cost.

A signal indicative of a wire tension is applied to differential amplifiers (13, 14) from a load cell (9) which receives a load corresponding to the wire tension through a cantilever (7) and a guide roller (8) supported by the lever, and output voltages each corresponding to the difference between an actual value and a set value of wire tension are supplied from the two amplifiers to a transistor (15) and a comparator (16), individually. The braking force of an electromagnetic brake gear (6) is variably controlled by means of the transistor, and the wire tension is feedback-controlled to the set value. If the wire tension gives out due to disconnection, the amplifier output voltage applied to the comparator becomes higher than a reference voltage for disconnection discrimination, and a signal indicative of a disconnection state is delivered from the comparator.

6 Claims, 1 Drawing Sheet

APPARATUS FOR WIRE TENSION CONTROL AND DISCONNECTION DETECTION

BACKGROUND OF THE INVENTION

1. Field of the Invention

The present invention relates to an apparatus for wire tension control and disconnection detection for a wire-cut electric discharge machine.

2. Description of the Related Art

In a conventional wire-cut electric discharge machine, tension is applied to a running wire electrode (hereinafter referred to as the wire) by subjecting the wire to a braking force by means of a brake gear. The braking force is open-loop-controlled to adjust the wire tension to a predetermined value, and flexure of the wire caused by disconnection is detected by means of a limit switch opposed to the wire, thereby effecting disconnection detection.

According to the electric discharge machine with the construction described above, the braking force is controlled in an open-loop manner, so that the wire tension control sometimes cannot be accurately performed. Since a wire tension control system and a disconnection detection system are arranged independent of each other, moreover, high cost is entailed.

SUMMARY OF THE INVENTION

An object of the present invention is to provide an apparatus for wire tension control and disconnection detection for a wire-cut electric discharge machine, the apparatus being capable of accurate wire tension control and disconnection detection and entails only low cost.

In order to achieve the above object, according to the present invention, there is provided an apparatus for wire tension control and disconnection detection for use in wire-cut electric discharge machine including a guide roller for guding a wire and a brake gear for applying a braking force to the wire, thereby producing a wire tension. This apparatus includes a lever supporting the guide roller for rotation and swingable support, tension detecting means for outputting a signal indicative of a load bearing on the lever through the guide roller and corresponding to the wire tension, brake control means for controlling the braking force in accordance with a difference between a value of the output signal of the tension detecting means and a set value of wire tension, and disconnection detecting means for detecting disconnection on the basis of the output signal of the tension detecting means.

According to the present invention, as described above, feedback control of the wire tension and the disconnection detection are effected in accordance with the output signal of the tension detecting means, which is indicative of the wire tension, so that the wire tension control and the disconnection detection can be accurately achieved, and a common sensor can be used for both the control and the detection, thus ensuring reduction in cost.

DETAILED DESCRIPTION OF THE PREFERRED EMBODMENTS

Figure 1:
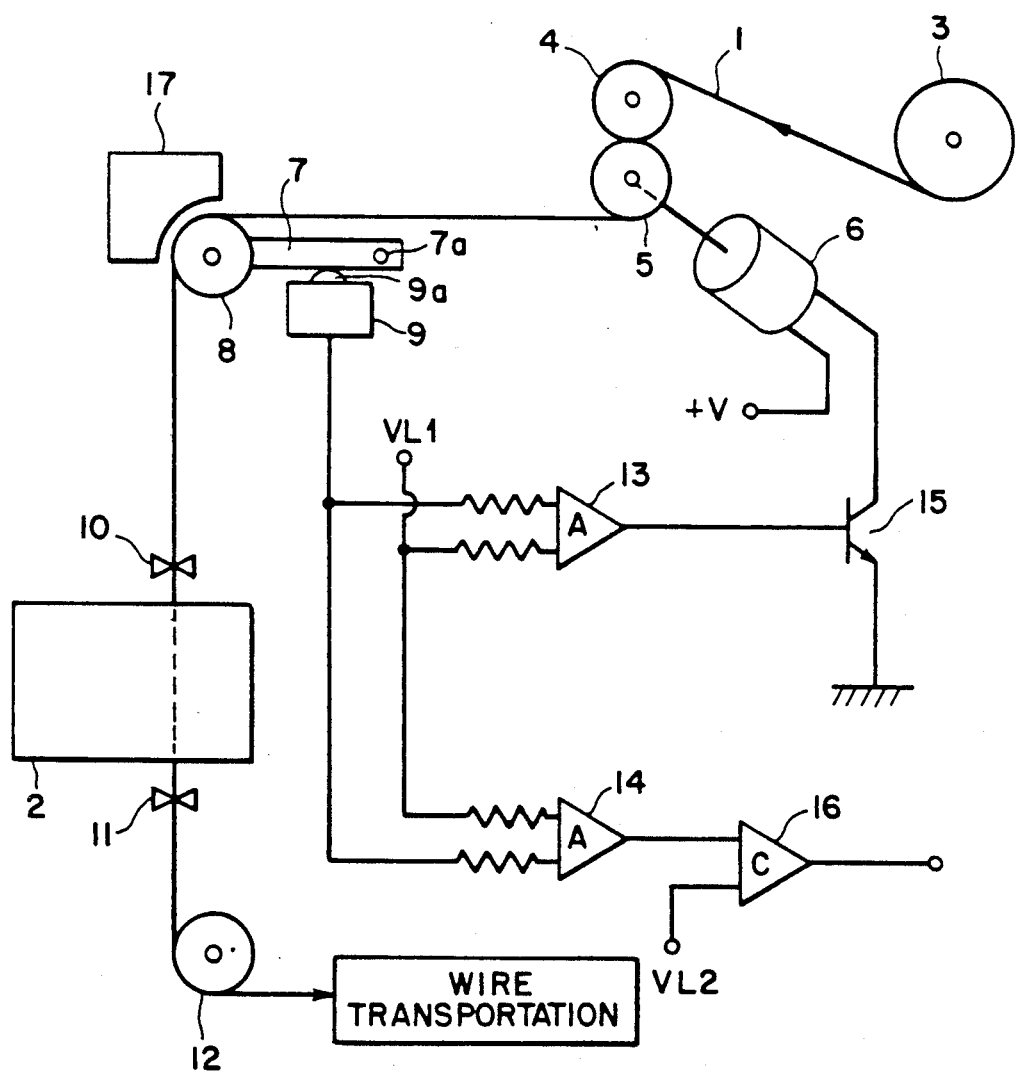
FIG. 1 is a schematic view showing the principal part of a wire-cut electric discharge machine provided with an apparatus for wrie tension control and disconnection detection according to one embodiment of the present invention.

In the accompanying drawing, a wire-cut electric discharge machine causes wire transportation means WT to drive a wire 1 delivered from a wire supply bobbin 3, thereby running the wire along a pinch roller 4, a brake roller 5, a guide roller 8, an upper guide 10, a machining groove formed on a workpiece 2, a lower guide 11, and a guide roller 12, and applies a machining voltage between the wire 1 and the workpiece 2, thereby causing electric discharge between them to effect electric discharge machining. Numberal 6 denotes an electromagnetic brake gear, which is arranged so as to brake the brake roller 5 to apply a braking force to the wire 1, thereby producing a wire tension. Numeral 17 denotes a backup plate for preventing the wire 1 from slipping off the guide roller 8 in case of, for example, disconnection.

Further, the electric discharge machine includes an apparatus for wire tension control and disconnection detection, which is provided with a of lever 7. One end of the lever 7 is pivotally supported by a shaft 7a, while the other end supports the guide roller 8 for rotation. Also, the lever 7 is supported, at a medial portion thereof, by a pressure detecting portion 9a of a load cell 9 as tension detecting means. The output terminal of the load cell 9 is connected to one input terminal of a differential amplifier 13, which constitutes brake control means in conjunction with a transistor 15. A reference voltage VL1 corresponding to a set value of wire tension is applied to the other input terminal of the amplifier 13. The output terminal of the amplifier 13 is connected to the base of the transistor 15, whose collector is connected to a solenoid (not shown) of the brake gear 6, and whose emitter is grounded.

Further, the output terminal of the load cell 9 is connected to one input terminal of a second differential amplifier 14, which constitutes disconnection detecting means in conjunction with a comparator 16, and receives the reference voltage VL1 at the other input terminal thereof. The output terminal of the amplifier 14 is connected to one input terminal of the comparator 16, which receives a reference voltage VL2 for disconnection discrimination at the other input terminal thereof. The gain of the amplfier 13 is set to a large value, while the gain of the amplifier 14 is set to a small value. The output terminal of the comparator 16 is connected to a numerical control unit (not shown) for controlling various operations of the electric discharge machine and delivering the aforesaid reference voltages VL1 and VL2.

The following is a description of the operation of the electric discharge machine with the aforementioned construction.

First, an operator operates a keyboard of the numerical control unit to input the set value of wire tension, and then starts the electric discharge machine. At the start of the operation, the electric discharge machine performs conventional wire threading as required.

As the wire 1 travels along the illustrated wire transportation path, an operative force, resulting from the wire tension, causes the lever 7 to rotate in the counterclockwise direction, as viewed in the drawing, around the shaft 7a, thus acting on the lever 7 through the medium of the guide roller 8. As a result, a load corresponding to the wire tension acts on the pressure detecting portion 9a of the load cell 9 through the medium of the lever 7, and an elecrical output signal corresponding in voltage to the load is delivered from the load cell 9 to the one input terminal of each of the differential amplifiers 13 and 14. Since the weights of the cantilever 7 and the guide roller 8 bear on the load cell 9, moreover, they are compensated for by calibrating the load cell 9 beforehand in accordance with the aforesaid weights, or by offsetting the reference voltage VL1 according to these weights.

The amplifier 13 applies an output voltage, which corresponds to the difference between the output voltage of the load cell 9 and the reference voltage VL1 corresponding to the set wire tension, to the base of the transistor 15. As a result, an electric current corresponding to the aforesaid difference flows through the solenoid of the brake gear 6, so that the braking force of the brake roller 5 is subjected to variable control. Thus, if the wire tension is smaller than the set value, the output voltage of the load cell 9 is low. Accordingly, the output voltage of the differential amplifier 13, the current flowing through the brake gear 6, and the braking force of the brake roller 5 increase individually, so that the wire tension increases. If the wire tension is greater than the set value, on the other hand, the elements 9, 13, 6 and 5 operate contrary the manner for the small wire tension, so that the wire tension is reduced. Thus, the wire tension is controlled to the set value in a feedback manner.

In case of no disconnection, the aforementioned wire tension control is executed, so that the difference between the load cell output voltage and the reference voltage VL1, applied individually to both input terminals of the differential amplifier 14 of the disconnection detecting means, is small, and the output voltage of the amplfier 14 correspoding to this difference is lower than the reference voltage VL2 for disconnection discrimination. Thus, an output signal from the comparator 16 is at an L-level indicative of a no-disconnection state.

If the wire 1 snaps so that the wire tension is gone, the output voltage of the load cell 9 lowers, so that the difference between the load cell output voltage and the reference voltage VL1 increases. As a result, the output voltage of the amplifier 14 exceeds the reference voltage VL2, and an output voltage of an H-level indicative of a disconnection state is delivered from the comparator 16 to the numerical control unit.

The present invention is not limited to the emobidment described above, and various modifications may be effected therein. In the above embodiment, for example, the differential amplifier 14 is used to input the reference voltage VL1 corresponding to the set value of wire tension and the output voltage of the load cell 9. Instead of using this, however, an amplifier may be used simply to amplify the load cell output so that the output of the amplifier is applied to the comparator 16. In the above embodiment, moreover, the lever 7 is supported by means of the load cell. Alternatively, however, a spring may be additionally used to support the lever. Furthermore, the apparatus for wire tension control and disconnection detection according to the present invention may be mounted on an electric discharge machine of a type delivering a command for the start of application of wire tension in response to an operation of an exclusive-use switch therefor. When no wire tension is produced, in the electric discharge machine of this type, a disconnection detection signal is delivered from the comparator 16 even though the wire is not subject to disconnection. It is therefore necessary to provide a circuit for invalidating this signal.

We claim:

1. An apparatus for wire tension control and disconnection detection for use in a wire-cut electric discharge machine comprising:
    a guide roller for guiding a wire which is pulled over the guide roller by wire transportation means located downstream of a workpiece and a brake gear for applying a braking force to the wire, thereby producing a wire tension;
    a lever having a distal end for supporting said guide roller for rotation and having a proximal end for pivotally mounting the lever;
    tension detecting means for outputting a signal indicative of a load bearing on said lever through the guide roller and corresponding to a value of wire tension sensed at the machining area by the workpiece;
    brake control means, receiving the output signal of the tension detecting means, for controlling said braking force in accordance with a difference between the value of the output signal of said tension detecting means and a set value of wire tension; and
    disconnection detecting means for detecting a disconnection on the basis of the value of the output signal of said tension detecing means.

2. An apparatus for wire tension control and disconnection detection according to claim 1, wherein said tension detecting means includes a load cell, said load cell supporting said lever.

3. An apparatus for wire tension control and disconnection detection according to claim 1, wherein said brake control means includes a differential amplifier receiving the output signal of said tension detecting means and a signal indicative of the set value of wire tension and producing an output signal corresponding to the difference between said two signals.

4. An apparatus for wire tension control and disconnection detection according to claim 3, wherein said brake gear includes an electromagnetic brake gear and a brake roller, and said brake control means includes a transitor for adjusting a driving current for said electromagnetic brake gear in accordance with said output signal of said differential amplifier.

5. An apparatus for wire tension control and disconnection detection according to claim 1, wherein said disconnection detecting means includes an amplifier adpated to receive said output signal of said tension detecting means and a comparator for comparing an output signal from said amplifier and a reference signal for disconnection discrimination.

6. An apparatus for wire tension control and disconnection detection of use in a wire-cut electric discharge machine comprising:
    a guide roller for guiding a wire which is pulled over the guide roller by wire transportation means located downstream of a workpiece and a brake gear for applying a braking force to the wire, thereby producing a wire tension;
    a lever having a digital end for supporting said guide roller for rotation and having a proximal end for pivotally mounting the lever;
    tension detecting means for outputting a signal indicative of a load bearing on said lever through the guide roller and corresponding to a value of wire tension sensed at the machining area by the workpiece; and
    brake control means, receiving the output signal of the tension detecting means, for controlling said braking force in accordance with a difference between the value of the output signal of said tension detecting means and a set value of wire tension.

* * * * *